(12) United States Patent
Lee

(10) Patent No.: US 12,500,468 B2
(45) Date of Patent: Dec. 16, 2025

(54) ELECTRIC COMPRESSOR FOR VEHICLE

(71) Applicant: ESTRA AUTOMOTIVE SYSTEMS CO., LTD., Daegu (KR)

(72) Inventor: Geun Soo Lee, Daegu (KR)

(73) Assignee: ESTRA AUTOMOTIVE SYSTEMS CO., LTD., Daegu (KR)

( * ) Notice: Subject to any disclaimer, the term of this patent is extended or adjusted under 35 U.S.C. 154(b) by 305 days.

(21) Appl. No.: 18/256,660

(22) PCT Filed: Dec. 3, 2021

(86) PCT No.: PCT/KR2021/018215
§ 371 (c)(1),
(2) Date: Jun. 9, 2023

(87) PCT Pub. No.: WO2022/124707
PCT Pub. Date: Jun. 16, 2022

(65) Prior Publication Data
US 2024/0039357 A1    Feb. 1, 2024

(30) Foreign Application Priority Data
Dec. 10, 2020  (KR) .................. 10-2020-0172627

(51) Int. Cl.
*H02K 11/33*   (2016.01)
*B60H 1/32*    (2006.01)
(Continued)

(52) U.S. Cl.
CPC .......... *H02K 3/522* (2013.01); *B60H 1/3222* (2013.01); *B60H 2001/3292* (2013.01)

(58) Field of Classification Search
CPC .......... H02K 3/522; H02K 3/521; H02K 3/50; H02K 3/52; H02K 11/30; H02K 11/33;
(Continued)

(56) References Cited

U.S. PATENT DOCUMENTS 8,840,381 B2 *  9/2014  Fukasaku ............... F04B 35/04
                                                     310/71
9,574,560 B2 *  2/2017  Adaniya ................ F04C 11/008
(Continued)

FOREIGN PATENT DOCUMENTS

DE   102008000124 A1 *  7/2009  ............. H02K 11/33
JP    H01311579 A  * 12/1989
(Continued)

OTHER PUBLICATIONS

Office Action to KR10-2020-0172627 from Korea Intellectual Property Officie.
Chinese Office Action mailed on Jun. 20, 2025.

*Primary Examiner* — Edgardo San Martin
(74) *Attorney, Agent, or Firm* — You & IP, LLC

(57) ABSTRACT

Proposed is an electric compressor for a vehicle configured such that an electrical connection structure between a winding coil of an electric motor and a sealing terminal that connects an inverter unit to the electric motor is improved, thereby being capable of increasing assemblability of a product and reducing a production cost. The electric compressor includes an electric motor provided with a stator, a rotor, and a rotary shaft, a compression unit configured to compress a refrigerant according to a rotation of the rotary shaft, an inverter configured to control driving of the electric motor, a sealing terminal electrically connecting the electric motor to the inverter, and a cluster integrally formed on a portion of the stator, the cluster having an inner portion thereof provided with multiple connection terminals for electrically connecting a coil wound on the stator to multiple connection pins provided at the sealing terminal.

9 Claims, 7 Drawing Sheets

(51) Int. Cl.
*F04C 23/02* (2006.01)
*H01R 13/42* (2006.01)
*H02K 3/52* (2006.01)
*H02K 5/22* (2006.01)

(58) Field of Classification Search
CPC ............ H02K 1/04; H02K 5/22; H02K 5/225; H02K 2203/06; H02K 2203/09; H02P 27/06; H02P 27/05; H02P 27/04; H01R 13/42; H01R 13/422; H01R 13/40; H01R 13/424; H01R 9/22; H01R 9/223; H01R 9/226; H01R 9/24; F04C 23/02; F04C 29/00; F04C 2240/40; F04C 2240/803; F04C 2240/808; B60T 13/74; B60T 17/02; F04B 17/03; F04B 35/04; F04D 25/06; F04D 25/0693; B60H 1/3222; B60H 2001/3292
See application file for complete search history.

(56) References Cited

U.S. PATENT DOCUMENTS

| | | | | |
|---|---|---|---|---|
| 9,595,853 B2 * | 3/2017 | Taguchi | .................. | H02K 5/12 |
| 9,608,492 B2 * | 3/2017 | Nagumo | .................. | H02K 3/28 |
| 10,454,334 B2 * | 10/2019 | Heo | .................. | H02K 5/225 |
| 10,707,715 B2 * | 7/2020 | Hamana | .................. | H02K 3/345 |
| 10,815,995 B2 * | 10/2020 | Heo | .................. | H02K 5/22 |
| 11,183,902 B2 * | 11/2021 | Guntermann | .................. | H02K 11/33 |
| 11,437,882 B2 * | 9/2022 | Takimoto | .................. | H02K 11/33 |
| 11,536,492 B2 * | 12/2022 | Kim | .................. | F04C 23/008 |
| 11,658,538 B2 * | 5/2023 | Seok | .................. | H02K 5/225 310/71 |
| 11,855,503 B2 * | 12/2023 | Takayama | .................. | F25B 31/026 |
| 12,184,142 B2 * | 12/2024 | Baek | .................. | F25B 31/026 |
| 12,283,865 B2 * | 4/2025 | Inoue | .................. | H02K 21/16 |
| 2018/0351428 A1 * | 12/2018 | Okamoto | .................. | H02K 3/28 |
| 2020/0021160 A1 * | 1/2020 | Kuratani | .................. | H02K 5/08 |
| 2020/0220399 A1 | 7/2020 | Lee et al. | | |
| 2020/0348050 A1 | 11/2020 | Kim et al. | | |
| 2023/0107796 A1 * | 4/2023 | Takimoto | .................. | H02K 5/04 417/423.7 |
| 2024/0014703 A1 * | 1/2024 | Walisko | .................. | H02K 5/225 |
| 2024/0072596 A1 * | 2/2024 | Sawarkar | .................. | H02K 3/50 |

FOREIGN PATENT DOCUMENTS

| | | | | | |
|---|---|---|---|---|---|
| JP | 2000-291557 A | | 10/2000 | | |
| JP | 2016084768 A | * | 5/2016 | ............ | H02K 11/30 |
| JP | 2017-158250 A | | 9/2017 | | |
| JP | 2019-178668 A | | 10/2019 | | |
| JP | 6881378 B2 | * | 6/2021 | ............ | F04C 23/008 |
| KR | 10-2014-0095798 A | | 8/2014 | | |
| KR | 20170120776 A | * | 11/2017 | ............ | F04B 35/04 |
| KR | 10-1936102 | | 1/2019 | | |
| KR | 10-2019-0030890 A | | 3/2019 | | |
| KR | 10-2172263 B1 | | 10/2020 | | |
| KR | 20220157859 A | * | 11/2022 | ............ | H02K 3/34 |
| KR | 20240106622 A | * | 7/2024 | ............ | H02K 11/01 |
| WO | WO-2018038339 A1 | * | 3/2018 | ............ | H02K 3/50 |
| WO | WO-2021015546 A1 | * | 1/2021 | ............ | F04C 29/0085 |
| WO | WO-2023248703 A1 | * | 12/2023 | ............ | H02M 7/48 |

* cited by examiner

ELECTRIC COMPRESSOR FOR VEHICLE

TECHNICAL FIELD

The present disclosure relates to an electric compressor for a vehicle. More particularly, the present disclosure relates to an electric compressor for a vehicle, the electric compressor being configured such that an electrical connection structure between a winding coil of an electric motor and a sealing terminal that connects an inverter to the electric motor is improved, thereby increasing assemblability of a product, and thereby reducing production cost of the product.

BACKGROUND ART

Generally, a compressor provided in an air conditioner for a vehicle is a device configured to suction a refrigerant that has evaporated from an evaporator, to convert the refrigerant into a high-temperature and high-pressure state so as to facilitate liquefaction, and to transfer the refrigerant to a condenser.

According to a method of compressing a refrigerant, such a compressor is classified into a reciprocating type compressor that performs compression while reciprocating and a rotary type compressor that performs compression while rotating. Furthermore, the rotary type compressor is classified into a mechanical type compressor in which a rotation is performed by using an engine as a driving source and an electric type compressor in which a rotation is performed by using a motor as a driving source.

Here, the electric type compressor is driven by an electric motor provided therein, and a rotation speed of the electric motor is controlled by an inverter provided in the electric type compressor.

As an example of an electric type compressor described above, in Japanese Patent Application Publication No. 2000-291557, an electric compressor having a structure in which a compressor apparatus unit, an electric motor, and an inverter are sequentially arranged along an axial direction is proposed. The electric compressor proposed in the Japanese Patent Application Publication No. 2000-291557 has a housing in which an inner portion thereof is divided into two spaces by a partition plate. In the two spaces, the electric motor is accommodated in one space and the inverter is accommodated in the other space. In addition, a sealing terminal (an air-tight terminal) for electrically connecting the electric motor and the inverter to each other is mounted on the partition plate, so that a structure in which the electric motor and the inverter are electrically connected to each other by the sealing terminal is formed.

In the electric type compressor configured as described above, the sealing terminal is applied so that an electrical connection between the electric motor and the inverter is realized. This is to maintain airtightness between both spaces through the sealing terminal in an environment where a high pressure difference occurs since a high pressure difference occurs between the space at which the electric motor is positioned and the space at which the inverter is positioned.

In addition, in the sealing terminal as described above, a male terminal having a pin shape is provided at a portion connected to the electric motor. Furthermore, a female terminal having a shape corresponding to the shape of the male terminal of the sealing terminal and a fixing mechanical structure having a terminal base shape for fixing the female terminal are mounted at a portion of the electric motor connected to the sealing terminal. In this case, the female terminal provided at the side of the electric motor is welded with a first side distal end of a lead wire by soldering, and a second side distal end of the lead wire is welded with a stripped winding coil of the electric motor by soldering, so that a structure in which the sealing terminal and the electric motor are electrically connected to each other is formed.

However, in a conventional electric compressor having a connection structure as described above, in order to electrically connect an inverter and an electric motor to each other by using a sealing terminal, complicated and cumbersome work in which an end portion of a winding coil of the electric motor is stripped, a first side distal end of a lead wire is welded with a female terminal provided at the electric motor by soldering, and then a second side distal end of the lead wire is welded with and connected to the female terminal by soldering is required to be performed. In addition, considering a flow environment of a refrigerant or oil inside the electric compressor, a vibration environment, and so on, additional processes such as impregnating of the winding coil of the electric motor, lacing, or the like may be required to be performed so that the winding coil of the electric motor, the lead wire, and the female terminal are stably coupled to each other. Therefore, there is a problem that substantial work and time are required when the electric compressor is assembled, and there is a problem that productivity of the electric compressor product is reduced and the production cost is increased.

DOCUMENT OF RELATED ART

Patent Document (Patent Document 1) Japanese Patent Application Publication No. 2000-291557 (Oct. 17, 2000)

DISCLOSURE

Technical Problem

Accordingly, the present disclosure has been made keeping in mind the above problems occurring in the related art, and an objective of the present disclosure is to provide an electric compressor structure for a vehicle, the electric compressor being configured such that a sealing terminal connecting an inverter and an electric motor is capable of being directly connected to a winding coil of the electric motor by a connection terminal, thereby increasing assemblability of a product by omitting and reducing conventional processes such as stripping a winding wire, wiring the winding wire and a lead wire to each other, wiring the lead wire and a terminal to each other, impregnating the wiring wire, lacing, and so on, and thereby increasing a productivity of the product and reducing the production cost of the product.

Technical Solution

In order to achieve the above objective, according to the present disclosure, there is provided an electric compressor for a vehicle, the electric compressor including: an electric motor provided with a stator, a rotor, and a rotary shaft; a compression unit configured to compress a refrigerant according to a rotation of the rotary shaft; an inverter unit configured to control driving of the electric motor; a sealing terminal electrically connecting the electric motor and the inverter unit to each other; and a cluster integrally formed on a portion of the stator, the cluster having an inner portion thereof provided with a connection terminal including a plurality of connection terminals for electrically connecting a coil including a plurality of coils wound on the stator to a connection pin including a plurality of connection pins provided at the sealing terminal.

Here, the stator may include: a stator core; and an insulator including a plurality of insulators, the plurality of insulators being respectively coupled to opposite ends of the stator core and on which the coils are wound, and the cluster may be integrally formed on one of the insulators positioned adjacent to the inverter unit.

In this case, the cluster may include: a connection terminal fixing unit that protrudes in a radial direction on a first side of an outer circumferential surface of the insulator, the connection terminal fixing unit having an inner side thereof provided with a fixing groove including a plurality of fixing grooves to which a portion of the connection terminal is capable of being fixed; and a connection terminal covering unit surrounding another portion of the connection terminal and being coupled to the connection terminal fixing unit.

In addition, the connection terminal may include: a male terminal fixed to a portion of the fixing groove, the male terminal being connected to an end portion of the coil while being in a state in which a portion of the male terminal is inserted inside the insulator; and a female terminal coupled to the male terminal, the female terminal being engaged with and connected to the connection pin of the sealing terminal.

In addition, a female terminal accommodating groove in which a portion of the female terminal is accommodated may be formed in an inner side of the connecting terminal covering unit, and the connection pin of the sealing terminal may be engaged with the female terminal and may be electrically connected to the female terminal while being in a state in which the connection pin is inserted inside the female terminal accommodating groove.

In addition, a slot in communication with the fixing groove may be formed in the insulator so that the portion of the male terminal is capable of being inserted inside the insulator.

In addition, the end portion of the coil connected to an end portion of the male terminal may be positioned parallel to the rotary shaft within the insulator.

At this time, the end portion of the male terminal may be formed in a hook shape, and may be joined to the end portion of the coil by surrounding the end portion of the coil.

In addition, the end portion of the male terminal may be disposed between the coils adjacent to each other along a circumferential direction.

In this case, the end portion of the male terminal to which the end portion of the coil is joined may be in contact with and supported on an inner circumferential surface of the insulator.

Meanwhile, the connection terminal covering unit may be detachably coupled to the connection terminal fixing unit.

In this case, the connection terminal covering unit may include: a female terminal accommodating unit having a female terminal accommodating groove in which a portion of the female terminal is accommodated; a male terminal shielding unit formed on a first side of the female terminal accommodating unit and configured to shield a portion of the male terminal fixed to the fixing groove; and a fastening unit part which protrudes on a first side of the male terminal shielding unit portion and which is fastened to the connection terminal fixing unit.

At this time, the connection terminal covering unit may further include: a coupling unit which protrudes on the first side of the female terminal accommodating unit and which has an inner side thereof provided with a coupling hole; a guide groove formed on the connection terminal fixing unit, the guide groove being configured to guide a movement of the coupling unit when the connection terminal covering unit is coupled; and a coupling protrusion which protrudes inside the guide groove and which is coupled to the coupling hole.

In this case, curved surfaces having smoothly curved shapes may be respectively formed on the guide groove and a portion of the coupling protrusion that are in initially contact with the coupling unit.

Advantageous Effects

According to the electric compressor for the vehicle according to the present disclosure configured as described above, the cluster provided with the connection terminal is integrally formed on the portion of the insulator of the stator around which the coil is wound, and a first side end of the connection terminal is joined to the end portion of the coil and a second side end of the connection terminal fixed to the cluster is directly connected to the connection pin of the sealing terminal. Therefore, since an electrical connection between the sealing terminal and the electric motor is capable of being established by a simple operation of engaging the connection pin of the sealing terminal with the portion of the connection terminal provided at the cluster, complicated and cumbersome processes such as stripping a motor winding coil, wiring the motor winding coil and a lead wire to each other, wiring the lead wire and a terminal to each other, and so on that are conventionally performed may be omitted. Particularly, since additional processes such as impregnating a winding coil, lacing, and so on that are conventionally performed so as to realize stable coupling in a vibration environment may be omitted or reduced, assemblability of a product may be increased, so that there is an advantage that the production cost of the product may be significantly reduced.

MODE FOR INVENTION

Figure 1:
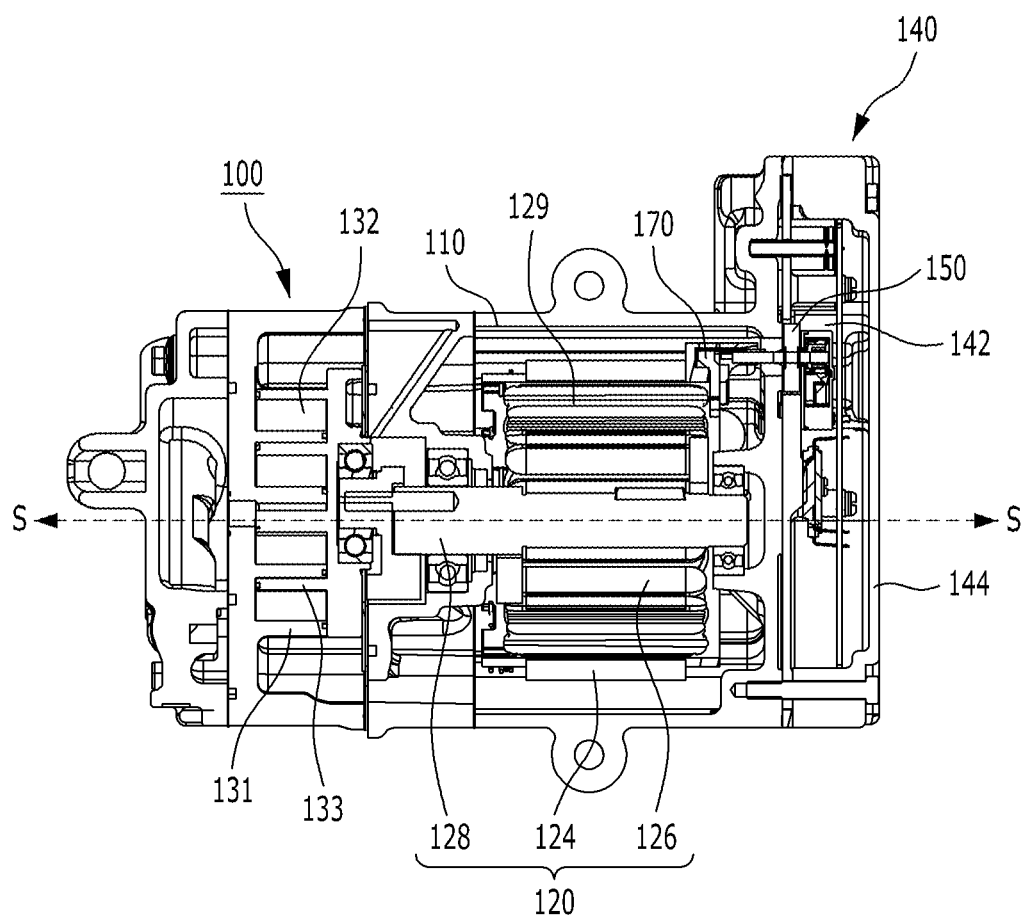
FIG. 1 is a cross-sectional view illustrating a cross-sectional structure of an electric compressor for a vehicle according to an embodiment of the present disclosure.

Hereinafter, an embodiment of the present disclosure will be described in detail with reference to the accompanying drawings so that those skilled in the art can easily implement the present disclosure.

However, the present disclosure is not limited to the embodiment described herein, and may be embodied in many different forms. In addition, it should be noted that parts denoted by the same reference numerals throughout the detailed description mean the same components.

Hereinafter, an electric compressor for a vehicle according to an embodiment of the present disclosure will be described in detail.

Figure 2:
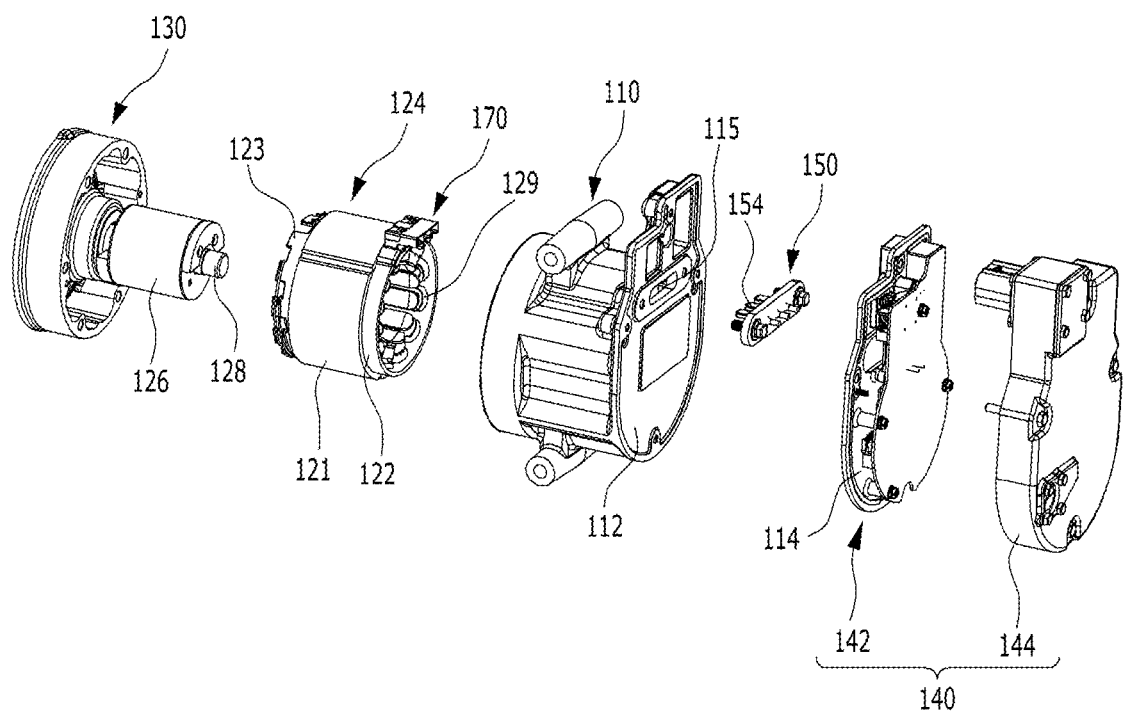
FIG. 2 is an exploded perspective view illustrating a main part configuration of the electric compressor of the present disclosure.

FIG. 1 is a cross-sectional view illustrating an overall cross-sectional structure of an electric compressor for a vehicle according to an embodiment of the present disclosure, and FIG. 2 is an exploded perspective view illustrating a main part configuration of the electric compressor according to the present disclosure.

Referring to FIG. 1 and FIG. 2, an electric compressor 100 according to an embodiment of the present disclosure includes: an electric motor 120 having a stator 124, a rotor 126, and a rotary shaft 128; a compression unit 130 configured to compress a refrigerant according to a rotation of the rotary shaft 128; an inverter unit 140 configured to control driving or the electric motor 120; a sealing terminal 150 electrically connecting the electric motor 120 to the inverter unit 140; and a cluster 170 integrally formed at a first side end portion of the stator 124, the cluster 170 having an inner portion thereof provided with a plurality of connection terminals 160 electrically connecting a winding coil 129 of the stator 124 to a connection pin 154 of the sealing terminal 150. Furthermore, the compression unit 130 configured to compress the refrigerant and the electric motor 120 configured to drive the compression unit 130 are accommodated in a motor housing 110.

A mounting unit 112 constituting an end portion wall for mounting the inverter unit 140 is formed at a first side end portion of the motor housing 110, and the inverter unit 140 configured to control driving of the electric motor 120 is coupled to the mounting unit 112.

The inverter unit 140 includes an inverter 142 mounted with a circuit substrate 114 on which circuits of various driving elements for driving the electric motor 120 are formed, and includes an inverter housing 144 in which the inverter 142 is accommodated.

The inverter 142 is configured to convert a direct current (DC) provided from the outside into a form of an alternating current (AC) and applies the alternating current to the electric motor 120, thereby controlling an operation and an output of the electric motor 120.

The electric motor 120 includes the stator 124 fixed to an inner circumferential surface of the motor housing 110, and includes the rotor 126 integrally coupled to the rotary shaft 128 and configured to be rotated together with the rotary shaft 128 inside the stator 124.

The stator 124 includes a stator core 121 formed by stacking a plurality of magnetic plates having ring shapes, a first insulator 122 and a second insulator 123 respectively coupled to opposite end portions of the stator core 121, and the plurality of coils 129 wound on inner circumferential portions of the first and second insulators 122 and 123.

The first insulator 122 and the second insulator 123 are formed of a non-conductive material such as a synthetic resin that does conduct electricity, and are inserted into the opposite end portions of the stator core 121 along an axial direction S and are respectively coupled to opposite ends of the stator core 121.

In addition, the coils 129 are repeatedly wound along the axial direction on the inner circumferential portions of the first and second insulators 122 and 123 that are coupled to the opposite ends of the stator core 121, so that the first insulator 122 and the second insulator 123 are maintaining a state of being fixed to the stator core 121 by the wound coils 129 while the first insulator 122 and the second insulator 123 are inserted into the opposite ends of the stator core 121.

The compression unit 130 includes a fixed scroll 131 fixed to the motor housing 110, and includes a movable scroll 133 engaged with the fixed scroll 131. Furthermore, a compression chamber 132 in which the refrigerant is compressed is formed between the fixed scroll 131 and the movable scroll 133.

The movable scroll 133 is coupled to a position eccentric from the rotary shaft 128 of the electric motor 120. Therefore, as the fixed scroll 131 is eccentrically rotated according to a rotation of the rotary shaft 128, a volume of the compression chamber 132 formed between the fixed scroll 131 and the movable scroll 133 is changed, thereby compressing the refrigerant.

The sealing terminal 150 is mounted on the mounting unit 112 of the motor housing 110 that is positioned between the electric motor 120 and the inverter 142, and the mounting unit 112 is provided with a penetration hole 115 through which the connection pin 154 provided on the sealing terminal 150 can pass. Therefore, as the connection pin 154 of the sealing terminal 150 passes through the penetration hole 115 and is engaged with and connected to the connection terminal 160 inside the cluster 170 that is formed at a portion of the first insulator 122 of the stator 124, the inverter 142 and the electric motor 120 may be electrically connected to each other via the connection terminal. The sealing terminal 150 further includes connection pins 155 to connect the sealing terminal 150 to the inverter 142.

Figure 3:
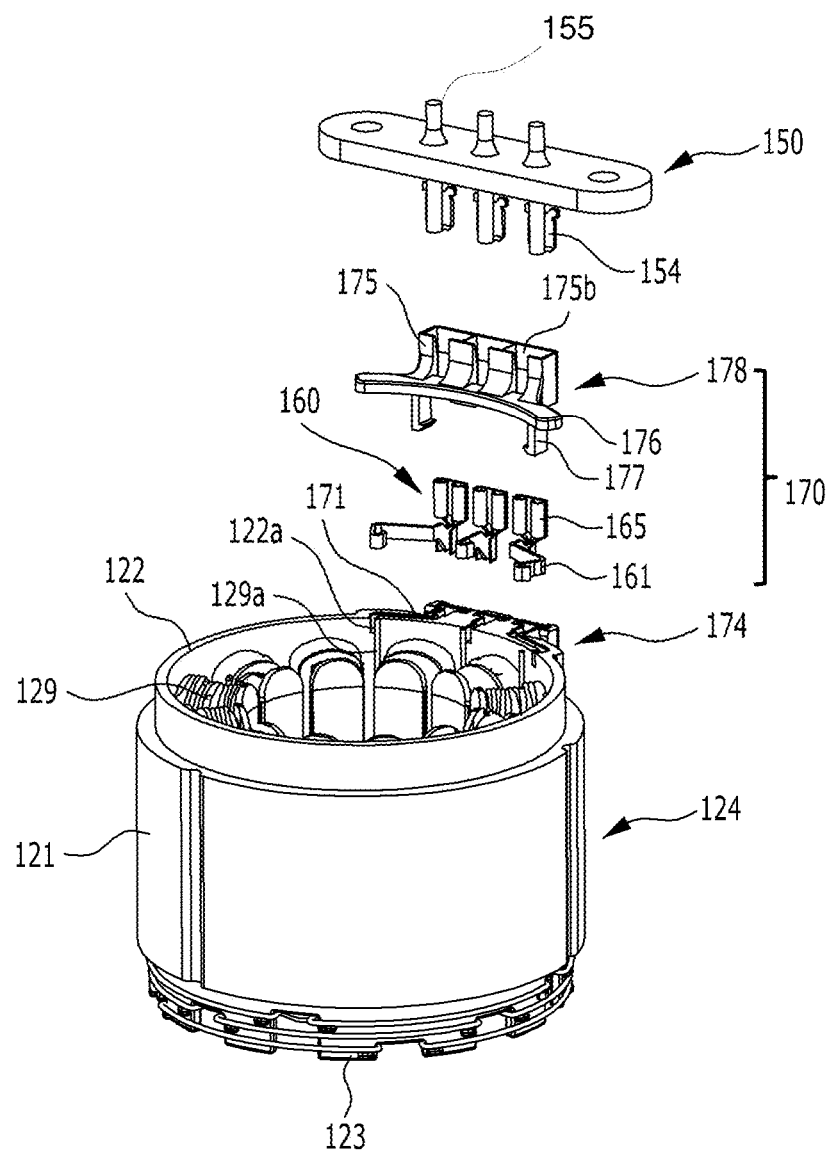
FIG. 3 is an exploded perspective view illustrating a state in which a cluster having a connection terminal is coupled to a portion of an insulator of a stator.
Figure 4:
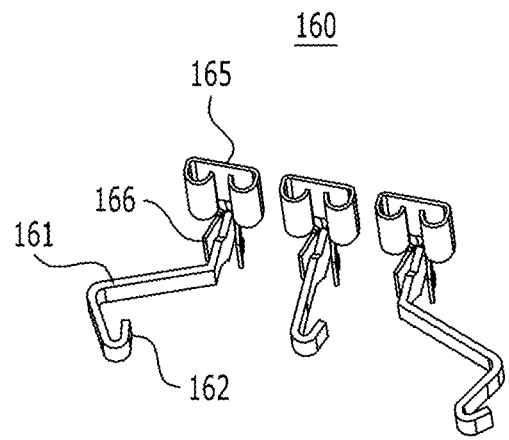
FIG. 4 is a detailed view illustrating a detailed structure of the connection terminal according to the present disclosure.

Meanwhile, FIG. 3 is an exploded perspective view illustrating a detailed configuration of the cluster 170 provided at an end portion side of the stator 124 according to the present disclosure, and FIG. 4 is a detailed view illustrating a detailed structure of the connection terminal 160 mounted inside the cluster 170.

Figure 5:
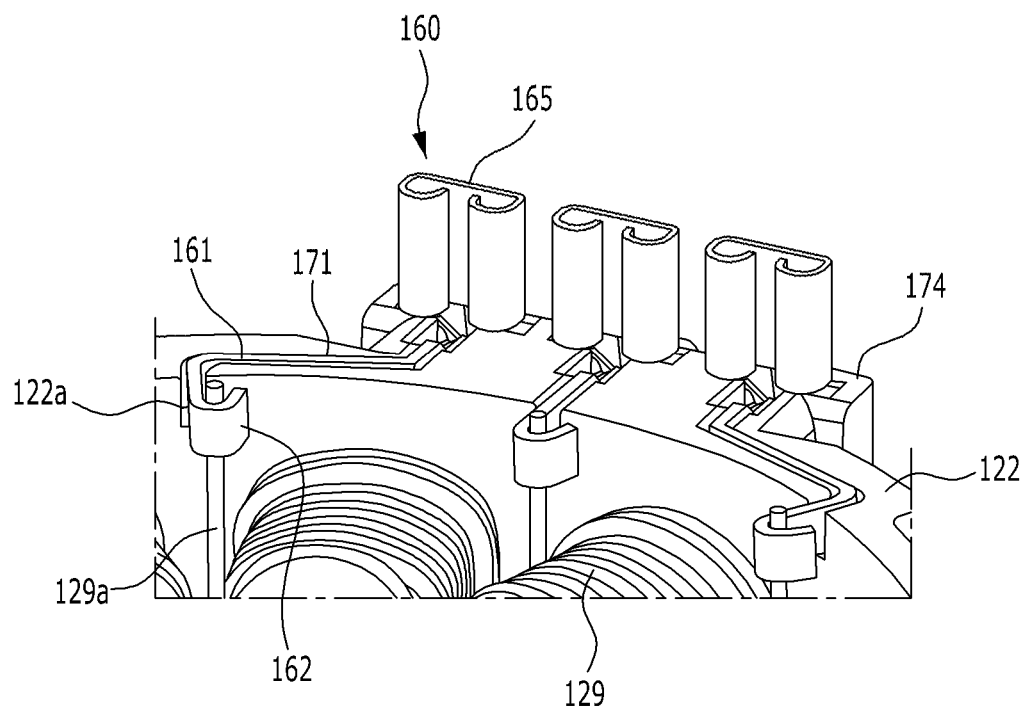
FIG. 5 is a partially enlarged perspective view illustrating a state in which the connection terminal is coupled to a connection terminal fixing unit formed on the portion of the insulator of the stator.
Figure 6:
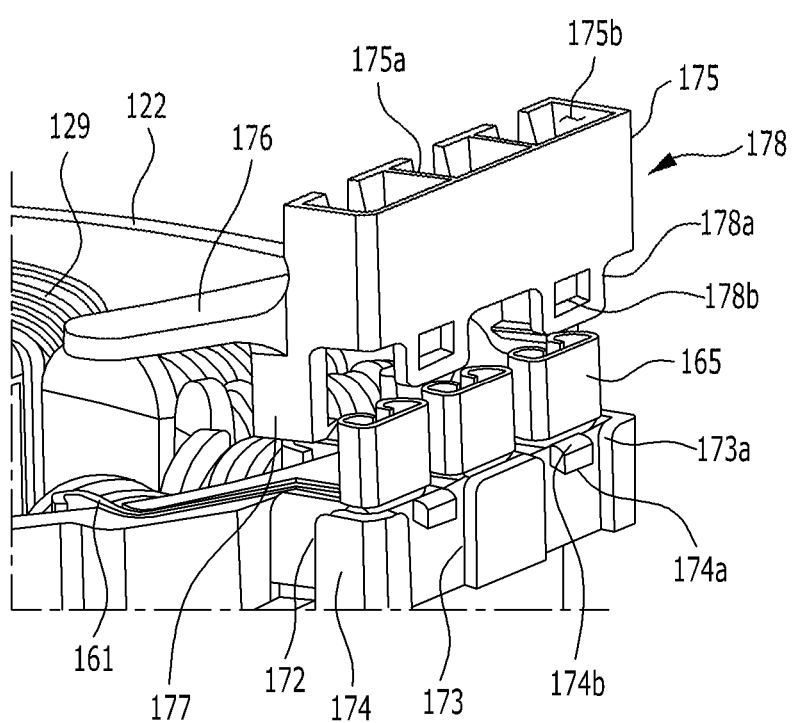
FIG. 6 is a perspective view illustrating a state in which a connection terminal covering unit is fastened to the connection terminal fixing unit.

In addition, FIG. 5 is a perspective view illustrating a state in which the connection terminal 160 is coupled to a portion of a connection terminal fixing unit 174 formed on a first side of the first insulator 122, and FIG. 6 is a perspective view illustrating a state in which a connection terminal covering unit 178 is fastened to the portion of the connection terminal fixing unit 174 when viewed from a back surface portion.

Figure 7:
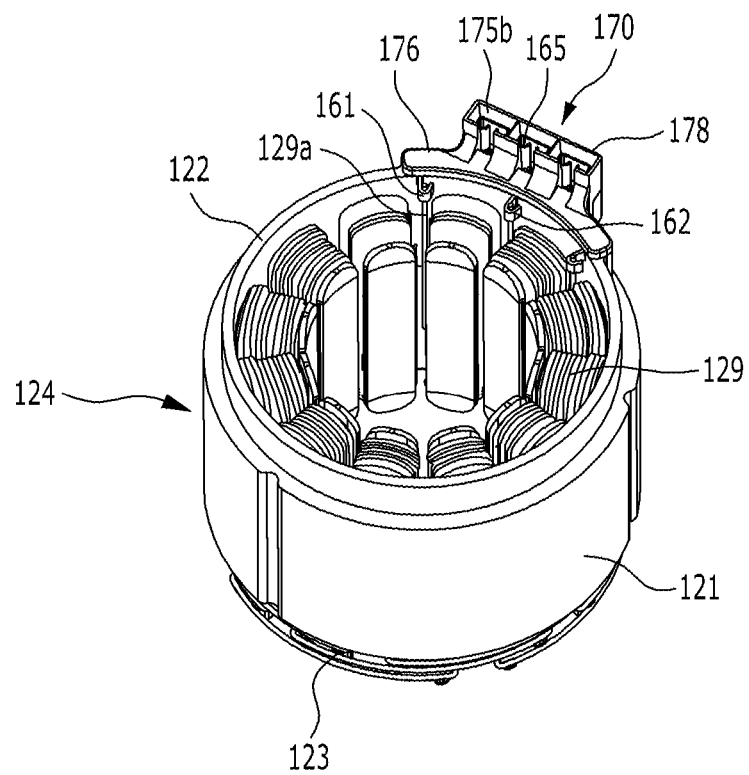
FIG. 7 is a perspective view illustrating a state in which the cluster is coupled to the portion of the insulator of the stator.
Figure 8:
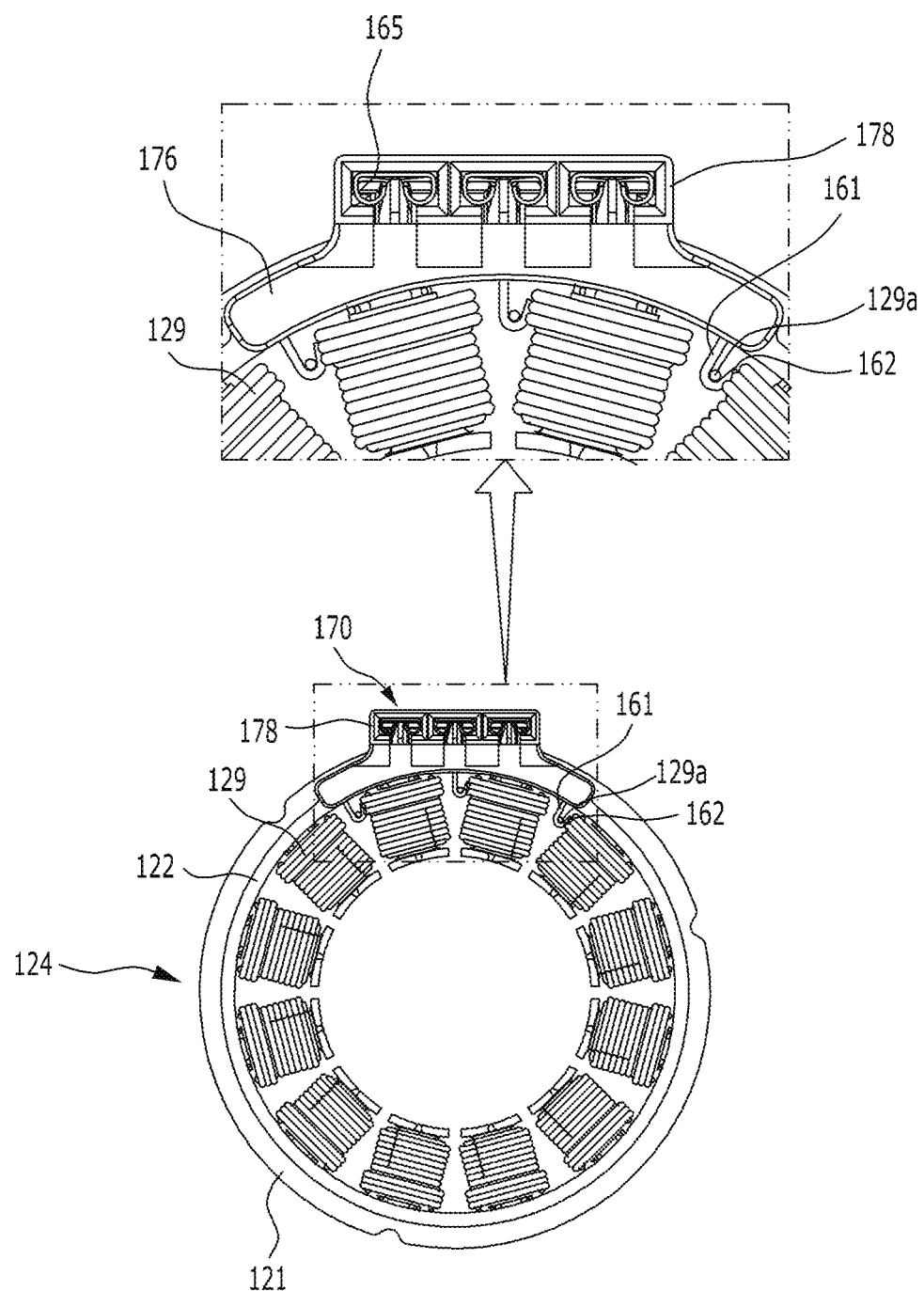
FIG. 8 is a plan view of FIG. 7 when viewed from above.

In addition, FIG. 7 is an assembled perspective view illustrating a state in which the cluster 170 is coupled to a portion of the first insulator 122 of the stator 124, and FIG. 8 is a plan view of FIG. 7 viewed from above.

Referring to FIG. 3 to FIG. 8, at the end portion side of the stator 124 disposed at a positioned adjacent to the inverter 142, i.e., the first side of the first side of the first insulator 122, the cluster 170 having the connection terminal 160 that is capable of electrically connecting the connection pin 154 of the sealing terminal 150 to the winding coil 129 inside the stator 124 is provided.

The cluster 170 is formed of a non-conductive material (for example, a synthetic resin) that is same as the first and second insulators 122 and 123. Furthermore, the cluster 170 includes the connection terminal fixing unit 174 which is integrally formed at a first side of an outer circumferential surface of the first insulator 122 and to which the connection terminal 160 is fixed, and includes the connection terminal covering unit 178 which covers the connection terminal 160 and which is coupled to the connection terminal fixing unit 174.

The connection terminal fixing unit 174 is formed in a structure that protrudes outward on the first side of the outer circumferential surface of the first insulator 122, and has an inner side thereof provided with a plurality of fixing grooves 171 to which a portion of the connection terminal 160 is capable of being fitted and fixed.

In this case, the fixing groove 171 is formed such that the fixing groove 171 has a groove shape corresponding to a shape of the connection terminal 160, and the connection terminal 160 in a state of being fitted to a portion of the fixing groove 171 may maintain a state of being fixed on the connection terminal fixing unit 174 by the shape of the fixing groove 171.

At this time, the connection terminal fixing unit 174 may be manufactured to form a single body with the first insulator 122.

In addition, the connection terminal covering unit 178 surrounds other portion of the connection terminal 160 that is fixed to the fixing groove 171 of the connection terminal fixing unit 174 and is coupled to the connection terminal fixing unit 174, so that a structure of the cluster 170 for electrical connection to the sealing terminal 150 may be formed.

Meanwhile, the connection terminal 160 includes a male terminal 161 connected to the electric motor 120, and includes a female terminal 165 connected to the sealing terminal 150. Furthermore, the male terminal 161 and the female terminal 165 are joined to each other and form the single connection terminal 160.

That is, the connection terminal 160 is provided with the male terminal 161 which is fixed to the portion of the fixing groove 171 of the connection terminal fixing unit 174 and which is connected to an end portion of the coil 129 while a portion of the male terminal 161 is inserted inside the first insulator 122, and is provided with the female terminal 165 which is joined to the male terminal 161 and which is engaged with and connected to the connection pin 154 of the sealing terminal 150.

The male terminal 161 is formed by bending an electric conductor at least once, the electric conductor having a thin and long bar shape. In the three-phase electric motor 120 on which three connection terminals 160 are mounted as in an embodiment, end portions of each male terminal 161 fixed to the fixing grooves 171 of the connection terminal fixing unit 174 are connected to end portions of the coils 129 while being inserted into spaces between the plurality of coils 129 arranged in a circumferential direction inside the stator 124.

Accordingly, the fixing groove 171 of the connection terminal fixing unit 174 to which the male terminal 161 is fixed is formed in a narrow and long curved groove shape corresponding to the shape of the male terminal 161.

In a state in which the male terminal 161 is fixed inside the fixing groove 171, a portion of the end portion of the male terminal 161 is connected to the end portion of the coil 129 while the portion of the end portion of the male terminal 161 is inserted into a space of the inner circumferential portion of the first insulator 122. To this end, a slot 122*a* in communication with the fixing groove 171 so that the portion of the end portion of the male terminal 161 is capable of being inserted into the space inside the first insulator 122 by passing through the first insulator 122 is formed in the first insulator 122.

The end portion of the male terminal 161 inserted into the space of the inner circumferential portion of the first insulator 122 is disposed between the neighboring coils 129 arranged along the circumferential direction inside the first insulator 122. In this case, a length of the male terminal 161 that is positioned at a center of the three male terminals 161 is smaller than lengths of the male terminals 161 positioned at opposite sides thereof, so that the end portions of the three male terminals 161 are arranged between the coils 129 along the circumferential direction inside the first insulator as in an embodiment.

In addition, an end portion 129*a* of the coil 129 connected to an end portion 162 of the male terminal 161 is positioned parallel to the rotary shaft 128 within the first insulator 122, thereby being connected to the end portion of the male terminal 161.

At this time, the end portion 162 of the male terminal 161 connected to the end portion 129*a* of the coil 129 is bent in a hook shape, and the end portion 162 of the male terminal 161 having the hook shape is joined to the coil 129 while forming a structure surrounding the end portion 129*a* of the coil 129.

In this case, when the end portion 129*a* of the coil 129 and the end portion 162 of the male terminal 161 are joined to each other, the end portion 129*a* of the coil 129 and the end portion 162 of the male terminal 161 may be electrically connected to each other by performing joining through a fusing method in which a portion of a base material is melt after the end portion 129*a* of the coil 129 is accommodated inside the end portion 162 of the male terminal 161 having the hook shape without performing additional stripping (stripping an enamel outer sheath of a coil) on the end portion 129*a* of the coil 129.

In addition, the portion of the end portion 162 of the male terminal 161 having the hook shape joined to the end portion 129*a* of the coil 129 by performing the fusing is in contact with and supported by the inner circumferential surface portion of the first insulator 122, so that a stable fastening force and a stable supporting force may be secured even in a vibration environment in which the electric motor 120 is driven.

At this time, the end portions 162 of the three male terminals 161 having the hook shapes disposed between the coils 129 that are arranged in the circumferential direction in the space of the inner circumferential portion of the first insulator 122 may be disposed to face the same direction along a clockwise direction, and the end portions 162 may be in contact with and supported by side surface portions of each of the coils 129 adjacent to each other.

Meanwhile, the female terminal 165 connected to the male terminal 161 is a portion to which the connection pin 154 provided on the sealing terminal 150 is connected, and is formed in a shape (a binocular-shaped curved shape) corresponding to the shape of the connection pin 154 in a bar-type such that the connection pin 154 of the sealing terminal 150 formed in the bar-type is inserted into and engaged with the female terminal 165.

In addition, a junction unit 166 having a 'V' shape is formed on a first side of the female terminal 165, and a first side end portion of the male terminal 161 is connected to the junction unit 166 by welding while the first side end portion of the male terminal 161 is seated inside the junction unit 166 of the female terminal 165 having the 'V' shape.

In this case, in an embodiment, an example in which the male terminal 161 and the female terminal 165 are manufactured in individual independent structures and then the connection terminal 160 is formed by joining the male terminal 161 and the female terminal 165 to each other is described. However, by performing a predetermined level of shape change on the male terminal 161 and the female terminal 165, the connection terminal 160 formed in a single structure may be manufactured.

Meanwhile, as described above, the connection terminal fixing unit 174 provided on the first side of the outer circumferential surface of the first insulator 122 is formed in a single body with the first insulator 122, and the connection terminal covering unit 178 for insulating the connection terminal 160 fixed inside the fixing groove 171 is assembled to the portion of the connection terminal fixing unit 174, so that the structure of the cluster 170 for electrical connection with the sealing terminal 150 is realized.

A female terminal accommodating groove 175b having a rectangular space sectioned by a partition wall 175a is formed inside the connection terminal covering unit 178 so as to accommodate a portion of the female terminal 165. Therefore, the connection pin 154 of the sealing terminal 150 is inserted inside the female terminal accommodating groove 175b, and is engaged with the female terminal 165, thereby being capable of being connected to the connection terminal 160. In addition, the connection terminal covering unit 178 is formed of the same material as the connection terminal fixing unit 174, and may be detachably assembled to the connection terminal fixing unit 174.

Specifically, the connection terminal covering unit 178 includes a female terminal accommodating unit 175 in which a plurality of female terminal accommodating grooves 175b is formed, a male terminal shielding unit 176 formed at a first side of the female terminal accommodating unit 175 and configured to shield the male terminal 161 fixed to the fixing groove 171, and a pair of fastening units 177 which protrudes on a first side of the male terminal shielding unit 176 and which is fastened to the connection terminal fixing unit 174.

The male terminal shielding unit 176 is formed in a circular arc shape corresponding to the circumferential shape of the first insulator 122, and is in contact with the connection terminal fixing unit 174 to which the male terminal 161 is fixed, thereby serving to shield the male terminal 161 so that the male terminal 161 is not exposed to the outside.

The pair of fastening units 177 protrudes from the male terminal shielding unit 176 in an axial direction of the stator 124, and is engaged with and elastically fastened to portions of a fastening groove 172 in a hook fastening manner, the portions of the fastening groove 172 being positioned at opposite side surfaces of the connection terminal fixing unit 174 and having concave structures.

That is, the connection terminal covering unit 178 may be fastened and assembled to the connection terminal fixing unit 174 by simply aligning the pair of fastening units 177 to the portions of the fastening groove 172 positioned at the opposite side surfaces of the connection terminal fixing unit 174 and then pushing the pair of fastening units 177 toward the axial direction S.

At this time, a pair of coupling units 178a that protrudes in a direction parallel to the pair of fastening units 177 is provided at a portion of the female terminal accommodating unit 175 positioned at an opposite side of the male terminal shielding unit 176 in the connection terminal covering unit 178, and a coupling hole 178b having a rectangular shape is formed inside the coupling unit 178a.

In addition, a guide groove 173 having a rectangular groove shape in a stepped structure for guiding a movement of the coupling unit 178a when the connection terminal covering unit 178 is assembled to the connection terminal fixing unit 174 is formed at a rear surface portion of the connection terminal fixing unit 174 corresponding to the coupling unit 178a. In addition, a coupling protrusion 174a having a hexahedral shape corresponding to the coupling hole 178b so that the coupling protrusion 174a is engaged with and coupled to the coupling hole 178b of the coupling unit 178a when the connection terminal covering unit 178 is assembled protrudes inside the guide groove 173.

Accordingly, when the connection terminal covering unit 178 is assembled to the connection terminal fixing unit 174, the pair of coupling units 178a formed on the female terminal accommodating unit 175 is moved along the inside of the pair of guide grooves 173 formed on the connection terminal fixing unit 174, so that assembly is capable of being realized by a coupling action between the coupling hole 178b and the coupling protrusion 174a.

At this time, curved surfaces 173a and 174b having smoothly curved shapes are respectively formed on the guide groove 173 and the coupling protrusion 174a that are in contact with the coupling unit 178a in an initial process of coupling, so that the coupling unit 178a is capable of being easily inserted inside the guide groove 173 through the curved surface 173a formed at an entrance portion of the guide groove 173. In addition, the coupling unit 178a is capable of being smoothly moved in an assembly direction (an axial direction) along the curved surface 174b formed at a portion of the coupling protrusion 174a, so that the coupling hole 178b is capable of being easily engaged with and coupled to the coupling protrusion 174a.

As such, the connection terminal covering unit 178 may be more rigidly fastened and coupled to the connection terminal fixing unit 174 by the pair of fastening units 177 positioned at the opposite side surfaces of the connection terminal covering unit 178 and the pair of coupling units 178a positioned at a rear surface portion of the connection terminal covering unit 178. Therefore, even in various vibration environments that occur when the electric motor 120 and the compression unit 130 are driven within the electric compressor 100, the cluster 170 may secure a rigid assemblability and a fastening force, thereby being capable of maintaining a stably coupled state.

According to the electric compressor for the vehicle according to the present disclosure configured as described above, the cluster 170 provided with the connection terminal 160 is integrally formed on the portion of the first insulator 122 of the stator 124 in which the coil 129 is wound, and a first side end of the connection terminal 160 is joined to the end portion 129a of the coil 129 and a second side end of the connection terminal 160 fixed to the cluster 170 is directly connected to the connection pin 154 of the sealing terminal 150. Therefore, since an electrical connection between the sealing terminal 150 and the electric motor 120 is capable of being maintained by a simple operation of engaging the connection pin 154 of the sealing terminal 150 with the portion of the connection terminal 160 provided at the cluster 170, complicated and cumbersome processes such as stripping a motor winding coil, wiring the motor winding coil and a lead wire to each other, wiring the lead wire and a terminal to each other, and so on that are conventionally performed in a method of manufacturing the electric compressor 100 product may be omitted. Particularly, since additional processes such as impregnating a winding coil, lacing, and so on that are conventionally performed so as to realize a stable coupling in a vibration environment may be omitted or reduced, assemblability of a product may be increased, so that there is an advantage that the production cost of the product may be significantly reduced.

Although the exemplary embodiment of the present disclosure has been described, but the scope of the present disclosure is not limited to such a specific embodiment, and those skilled in the relevant field will be able to appropriately change the embodiment within the scope of the claims of the present disclosure.

DESCRIPTION OF REFERENCE NUMERALS

100: electric compressor 110: motor housing
120: electric motor 121: stator core
122: first insulator 123: second insulator
124: stator 126: rotor
128: rotary shaft 129: coil
130: compression unit 131: fixed scroll
132: compression chamber 133: movable scroll
140: inverter unit 142: inverter
144: inverter housing 150: sealing terminal
160: connection terminal 161: male terminal
165: female terminal 170: cluster
171: fixed groove 172: fastening groove
173: guide groove 174: connection terminal fixing unit
175: female terminal accommodating unit 176: male terminal shielding unit
177: fastening unit 178: connection terminal covering unit
178a: coupling unit 178b: coupling hole
174a: coupling protrusion 173a, 174b: curved surface

The invention claimed is:

1. An electric compressor for a vehicle, the electric compressor comprising:
an electric motor provided with a stator, a rotor, and a rotary shaft, stator including a stator core;
a compression unit configured to compress a refrigerant according to a rotation of the rotary shaft;
an inverter unit configured to control driving of the electric motor;
a first insulator and a second insulator configured to be inserted into opposite end portions of the stator core along an axial direction of the rotary shaft and respectively coupled to opposite ends of the stator core, the first insulator having an end portion in the form of a hollow cylinder, the end portion including an outer circumferential surface, an inner circumferential surface, and an end face, and including
a connection terminal fixing unit integrally formed with the first insulator and protruding from the outer circumferential surface of the first insulator, such that a top surface of the connection terminal fixing unit and the end face of the first insulator lie in the same plane;
a sealing terminal configured to electrically connect the electric motor and the inverter unit to each other, the sealing terminal including
first connection pins, and
second connection pins configured to be connected to the inverter unit;
a plurality of connection terminals including
male terminals configured to electrically connect a plurality of coils wound on the stator core, and
female terminals configured to connect to the first connection pins provided at the sealing terminal; and
a connection terminal covering unit surrounding a portion of the connection terminals and being coupled to the connection terminal fixing unit, wherein the connection terminal covering unit is detachably coupled to the connection terminal fixing unit and includes:
a female terminal accommodating unit to accommodate a portion of the female terminals;
a male terminal shielding unit formed to shield a portion of the male terminal fixed to the fixing groove; and
a fastening unit part protruding on a first side of the male terminal shielding unit portion to be fastened to the connection terminal fixing unit,
wherein a plurality of fixing grooves are formed to extend across the top surface of the connection terminal fixing unit and the end face of the first insulator, such that a portion of each male terminal is received and fixed in the fixing grooves, and
wherein junction units having a 'V' shape are formed on each of the female terminals such that the male terminals are connected to the junction units, respectively, by welding while the male terminals are seated inside the junction units.

2. The electric compressor of claim 1, wherein the female terminal accommodating unit has female terminal accommodating grooves to accommodate the portion of the female terminals and the first connection pins of the sealing terminal such that the first connection pins are electrically connected to the female terminals while they are inserted inside the female terminal accommodating groove.

3. The electric compressor of claim 1, wherein a slot in communication with the fixing groove is formed in the first insulator so that the portion of the male terminal is capable of being inserted inside the first insulator.

4. The electric compressor of claim 1, wherein the end portion of each coil connected to an end portion of each male terminal is positioned parallel to the rotary shaft within the first insulator.

5. The electric compressor of claim 4, wherein the end portion of the male terminal is formed in a hook shape, and is joined to the end portion of the coil by surrounding the end portion of the coil.

6. The electric compressor of claim 4, wherein the end portion of the male terminal is disposed between the coils adjacent to each other along a circumferential direction.

7. The electric compressor of claim 5, wherein the end portion of the male terminal to which the end portion of the coil is joined is in contact with and supported on the inner circumferential surface of the first insulator.

8. The electric compressor of claim 1, comprising:
a coupling unit which protrudes on the first side of the female terminal accommodating unit and which has an inner side thereof provided with a coupling hole;
a guide groove formed on the connection terminal fixing unit, the guide groove being configured to guide a movement of the coupling unit when the connection terminal covering unit is coupled; and
a coupling protrusion which protrudes inside the guide groove and which is coupled to the coupling hole.

9. The electric compressor of claim 8, wherein curved surfaces having smoothly curved shapes are respectively formed on the guide groove and a portion of the coupling protrusion that are in initially contact with the coupling unit.

* * * * *